(12) United States Patent
Lonkar

(10) Patent No.: US 12,034,570 B2
(45) Date of Patent: Jul. 9, 2024

(54) MULTI-ELEMENT ROUTING SYSTEM FOR MOBILE COMMUNICATIONS

(71) Applicant: T-Mobile USA, Inc., Bellevue, WA (US)

(72) Inventor: Shon Anil Lonkar, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 47 days.

(21) Appl. No.: 17/694,274

(22) Filed: Mar. 14, 2022

(65) Prior Publication Data

US 2023/0291609 A1 Sep. 14, 2023

(51) Int. Cl.
*H04L 12/66* (2006.01)
*H04L 45/30* (2022.01)

(52) U.S. Cl.
CPC ............. *H04L 12/66* (2013.01); *H04L 45/30* (2013.01)

(58) Field of Classification Search
CPC ......... H04L 12/66; H04L 45/30; H04L 45/22; H04L 45/28; H04L 47/122; H04L 47/125
See application file for complete search history.

(56) References Cited

U.S. PATENT DOCUMENTS

| | | |
|---|---|---|
| 4,814,979 A | 3/1989 | Neches |
| 4,825,206 A | 4/1989 | Brice et al. |
| 4,933,933 A | 6/1990 | Dally et al. |
| 5,218,676 A | 6/1993 | Ben-ayed et al. |
| 5,309,430 A | 5/1994 | Verhille et al. |
| 5,313,590 A | 5/1994 | Taylor |
| 5,581,791 A | 12/1996 | Ludwig et al. |
| 5,925,137 A | 7/1999 | Okanoue et al. |
| 6,003,064 A | 12/1999 | Wicki et al. |
| 6,069,895 A | 5/2000 | Ayandeh |
| 6,115,751 A | 9/2000 | Tam et al. |
| 6,147,980 A | 11/2000 | Yee et al. |
| 6,487,289 B1 | 11/2002 | Phan et al. |
| 6,490,287 B1 | 12/2002 | Kilkki |

(Continued)

FOREIGN PATENT DOCUMENTS

| | | |
|---|---|---|
| CN | 1134138 C | 1/2004 |
| CN | 101616383 A | 12/2009 |

(Continued)

*Primary Examiner* — Charles C Jiang
*Assistant Examiner* — Rachel Elizabeth Marks
(74) *Attorney, Agent, or Firm* — Perkins Coie LLP

(57) ABSTRACT

A system includes multiple (e.g., three) routing elements that receive packets from a gateway and route the packets to multiple core network nodes. In normal operation, the gateway is configured to transmit messages to the first two routing elements with equal priority, while the third routing element is associated with a lower priority and functions as a backup. When one of the first two routing elements experiences network issues or is unavailable, then the third routing element is activated by adjusting the corresponding priority. Implementing the third routing element as a standby or backup element provides both redundancy and flexibility in case either of the first two routing elements becomes unsuitable for transmissions. Furthermore, the third routing element can be quickly activated to ensure that network service is not significantly impacted while the network is being restored.

17 Claims, 6 Drawing Sheets

(56) References Cited

U.S. PATENT DOCUMENTS

| | | |
|---|---|---|
| 6,584,093 B1 | 6/2003 | Salama et al. |
| 6,700,674 B1 | 3/2004 | Otsuka et al. |
| 6,735,441 B1 | 5/2004 | Turgeon et al. |
| 6,738,824 B1 | 5/2004 | Blair |
| 6,744,774 B2 | 6/2004 | Sharma |
| 6,836,477 B1 | 12/2004 | West et al. |
| 6,842,615 B2 | 1/2005 | Angin |
| 6,857,026 B1 | 2/2005 | Cain |
| 6,859,842 B1 | 2/2005 | Nakamichi et al. |
| 6,879,593 B1 | 4/2005 | Kunze et al. |
| 6,914,964 B1 | 7/2005 | Levine |
| 6,965,592 B2 | 11/2005 | Tinsley et al. |
| 6,967,956 B1 | 11/2005 | Tinsley et al. |
| 6,970,454 B1 | 11/2005 | Purcell et al. |
| 6,987,781 B1 | 1/2006 | Miller et al. |
| 6,996,630 B1 | 2/2006 | Masaki et al. |
| 7,012,895 B1 | 3/2006 | Mir |
| 7,035,256 B1 | 4/2006 | Neufeld et al. |
| 7,038,574 B1 | 5/2006 | Schlesener et al. |
| 7,046,619 B2 | 5/2006 | Alagar et al. |
| 7,116,774 B2 | 10/2006 | Gradischnig |
| 7,269,176 B1 | 9/2007 | Molinari |
| 7,318,091 B2 | 1/2008 | Brendes et al. |
| 7,318,108 B2 | 1/2008 | Sreekantiah et al. |
| 7,333,438 B1 | 2/2008 | Rabie et al. |
| 7,424,006 B1 | 9/2008 | Schlesener et al. |
| 7,715,366 B1 | 5/2010 | Schlesener et al. |
| 7,730,201 B1 | 6/2010 | Mcallister et al. |
| 7,778,248 B2 | 8/2010 | Scudder et al. |
| 7,796,581 B1 | 9/2010 | Rangarajan et al. |
| 7,796,601 B1 | 9/2010 | Norman |
| 7,839,769 B2 | 11/2010 | Veits |
| 7,940,666 B2 | 5/2011 | Beigne et al. |
| 7,948,945 B2 | 5/2011 | Budampati |
| 7,978,708 B2 | 7/2011 | Filsfils et al. |
| 8,014,404 B2 | 9/2011 | Ekl et al. |
| 8,130,656 B2 | 3/2012 | Bear et al. |
| 8,184,646 B2 | 5/2012 | Chen et al. |
| 8,224,337 B2 | 7/2012 | Gosnell et al. |
| 8,295,176 B2 | 10/2012 | Khasnabish |
| 8,423,760 B2 | 4/2013 | Kant et al. |
| 8,428,072 B2 | 4/2013 | Mariblanca |
| 8,472,315 B2 | 6/2013 | Sommerville et al. |
| 8,493,846 B2 | 7/2013 | Serbest |
| 8,503,306 B2 | 8/2013 | Turanyi et al. |
| 8,542,670 B2 | 9/2013 | Mahdi |
| 8,553,541 B2 | 10/2013 | Mihaly et al. |
| 8,553,561 B1 | 10/2013 | Chokshi et al. |
| 8,644,324 B2 | 2/2014 | Kanode et al. |
| 8,799,508 B2 | 8/2014 | Umetsu et al. |
| 8,964,668 B2 | 2/2015 | Rydnell et al. |
| 8,989,364 B2 | 3/2015 | Raty |
| 9,106,571 B2 | 8/2015 | Johnson |
| 9,294,734 B2 | 3/2016 | Inamura et al. |
| 9,392,534 B2 | 7/2016 | Vrbaski et al. |
| 9,473,235 B2 | 10/2016 | Anandappan et al. |
| 9,621,458 B2 | 4/2017 | Luo et al. |
| 9,832,128 B1 | 11/2017 | Ashner et al. |
| 9,882,950 B2 | 1/2018 | Rubin et al. |
| 9,912,488 B2 | 3/2018 | Chastain |
| 10,104,704 B2 | 10/2018 | Sharma et al. |
| 10,116,560 B2 | 10/2018 | Forbes |
| 10,237,720 B1 | 3/2019 | Mehra |
| 10,257,763 B2 | 4/2019 | Zhang et al. |
| 10,298,487 B2 | 5/2019 | Hao |
| 10,306,442 B1 | 5/2019 | Nuttall et al. |
| 10,425,342 B2 | 9/2019 | Gupta et al. |
| 10,432,427 B2 | 10/2019 | Chen |
| 10,778,527 B2 | 9/2020 | Assali et al. |
| 10,827,413 B2 | 11/2020 | Railkar et al. |
| 10,862,753 B2 | 12/2020 | Hira et al. |
| 10,932,097 B2 | 2/2021 | Hua et al. |
| 10,951,463 B2 | 3/2021 | Heitz et al. |
| 11,102,625 B2 | 8/2021 | Kim |
| 2003/0041208 A1 | 2/2003 | Volkmar |
| 2003/0126233 A1* | 7/2003 | Bryers .............. H04L 9/40 709/219 |
| 2004/0228356 A1* | 11/2004 | Adamczyk .......... H04L 12/2887 370/401 |
| 2004/0246902 A1 | 12/2004 | Weinstein et al. |
| 2005/0235065 A1 | 10/2005 | Le et al. |
| 2006/0153200 A1 | 7/2006 | Filsfils et al. |
| 2006/0176872 A1 | 8/2006 | Serna et al. |
| 2006/0203775 A1 | 9/2006 | Lemieux |
| 2007/0064886 A1 | 3/2007 | Chiu et al. |
| 2007/0110073 A1 | 5/2007 | Hirano |
| 2007/0121618 A1 | 5/2007 | Hirano |
| 2008/0043759 A1 | 2/2008 | Poetker et al. |
| 2009/0252134 A1* | 10/2009 | Schlicht .............. H04L 1/0015 709/205 |
| 2012/0163233 A1 | 6/2012 | Lee et al. |
| 2012/0271765 A1 | 10/2012 | Cervenka et al. |
| 2013/0115919 A1 | 5/2013 | Xu et al. |
| 2014/0126532 A1 | 5/2014 | Bapat et al. |
| 2015/0063301 A1 | 3/2015 | Faccin |
| 2017/0244670 A1* | 8/2017 | Maria ................ H04L 63/0227 |
| 2018/0159780 A1 | 6/2018 | Essigmann et al. |
| 2018/0302807 A1 | 10/2018 | Chen et al. |
| 2019/0082392 A1* | 3/2019 | Balasubramanian ........................ H04W 52/0245 |
| 2019/0190813 A1 | 6/2019 | Xu et al. |
| 2019/0297002 A1 | 9/2019 | Qian et al. |
| 2019/0379596 A1 | 12/2019 | Sharma et al. |
| 2020/0153726 A1 | 5/2020 | Veillette |
| 2020/0389407 A1 | 12/2020 | Pasio |
| 2022/0029911 A1 | 1/2022 | Zhang et al. |

FOREIGN PATENT DOCUMENTS

| | | |
|---|---|---|
| CN | 101667937 A | 3/2010 |
| CN | 101494608 B | 9/2011 |
| CN | 101902718 B | 4/2013 |
| CN | 102571608 B | 1/2015 |
| CN | 102833151 B | 7/2015 |
| CN | 102882785 B | 7/2015 |
| CN | 103973567 B | 9/2017 |
| CN | 103889002 B | 5/2019 |
| CN | 106937351 B | 4/2020 |
| CN | 107465566 B | 6/2020 |
| CN | 110996372 B | 5/2021 |
| CN | 113285877 A | 8/2021 |
| CN | 108934024 B | 9/2021 |
| CN | 109962959 B | 10/2021 |
| CN | 113489640 A | 10/2021 |
| CN | 113543146 A | 10/2021 |
| DE | 19930119 C2 | 6/2001 |
| DE | 102015210961 A1 | 12/2016 |
| DE | 102015214239 A1 | 2/2017 |
| EP | 0185122 A1 | 6/1986 |
| EP | 0689371 A1 | 12/1995 |
| EP | 0775427 B1 | 10/1999 |
| EP | 0954920 A1 | 11/1999 |
| EP | 1113696 A2 | 7/2001 |
| EP | 1130930 A1 | 9/2001 |
| EP | 1368937 A1 | 12/2003 |
| EP | 1192791 B1 | 5/2005 |
| EP | 1177660 B1 | 8/2006 |
| EP | 1583283 B1 | 12/2007 |
| EP | 2685674 A2 | 1/2014 |
| EP | 3542354 A1 | 9/2019 |
| EP | 3669504 A1 | 6/2020 |
| EP | 2628278 B1 | 8/2021 |
| JP | 3572551 B2 | 7/2004 |
| JP | 2009042243 A | 2/2009 |
| JP | 5054715 B2 | 8/2012 |
| JP | 5877872 B2 | 2/2016 |
| JP | 6382999 B2 | 8/2018 |
| JP | 2019121923 A | 7/2019 |
| JP | 2019520766 A | 7/2019 |
| KR | 940009088 B1 | 9/1994 |
| KR | 0168941 B1 | 2/1999 |
| KR | 100271856 B1 | 11/2000 |
| KR | 100311226 B1 | 10/2001 |

(56) References Cited

FOREIGN PATENT DOCUMENTS

| | | |
|---|---|---|
| KR | 100299061 B1 | 11/2001 |
| KR | 100333735 B1 | 4/2002 |
| KR | 20020069578 A | 9/2002 |
| KR | 100506244 B1 | 8/2005 |
| KR | 100584088 B1 | 5/2006 |
| KR | 100710896 B1 | 4/2007 |
| KR | 100859811 B1 | 9/2008 |
| KR | 100861765 B1 | 10/2008 |
| KR | 100872170 B1 | 12/2008 |
| KR | 20100131615 A | 12/2010 |
| KR | 101025908 B1 | 3/2011 |
| KR | 20110097516 A | 8/2011 |
| KR | 101251970 B1 | 4/2013 |
| KR | 101305313 B1 | 9/2013 |
| KR | 101381807 B1 | 4/2014 |
| KR | 101421160 B1 | 7/2014 |
| KR | 101506340 B1 | 3/2015 |
| KR | 101757871 B1 | 7/2017 |
| KR | 20190013012 A | 2/2019 |
| KR | 20190081407 A | 7/2019 |
| KR | 102043196 B1 | 11/2019 |
| KR | 102128417 B1 | 7/2020 |
| WO | 9916260 A1 | 4/1999 |
| WO | 0049774 A1 | 8/2000 |
| WO | 0079719 A2 | 12/2000 |
| WO | 2004054293 A1 | 6/2004 |
| WO | 2007095836 A1 | 8/2007 |
| WO | 2008022990 A1 | 2/2008 |
| WO | 2010045960 A1 | 4/2010 |
| WO | 2016019985 A1 | 2/2016 |
| WO | 2017205116 A1 | 11/2017 |
| WO | 2018075811 A2 | 4/2018 |
| WO | 2018202141 A1 | 11/2018 |
| WO | 2020199896 A1 | 10/2020 |
| WO | 2021015349 A1 | 1/2021 |
| WO | 2021036334 A1 | 3/2021 |
| WO | 2021037262 A1 | 3/2021 |
| WO | 2021135419 A1 | 7/2021 |
| WO | 2021160676 A1 | 8/2021 |
| WO | 2021168813 A1 | 9/2021 |
| WO | 2021196962 A1 | 10/2021 |
| WO | 2021213185 A1 | 10/2021 |
| WO | 2021217872 A1 | 11/2021 |

* cited by examiner

MULTI-ELEMENT ROUTING SYSTEM FOR MOBILE COMMUNICATIONS

BACKGROUND

A telecommunications network is a group of nodes interconnected by telecommunications links that are used to exchange messages between the nodes. The links may use a variety of technologies based on the methodologies of circuit switching, message switching, or packet switching, to pass messages and signals.

Multiple nodes may cooperate to pass the message from an originating node to the destination node, via multiple network hops. For this routing function, each node in the network is assigned a network address for identification and locating it on the network. The collection of addresses in the network is called the address space of the network.

Telecommunications networks have moved the world toward an increasingly connected society. As the number of users and devices in these networks increases, so does reliance on these networks for a variety of applications. Therefore, it is crucial that networks have systems in place to ensure high performance and availability.

BRIEF DESCRIPTION OF THE DRAWINGS

Detailed descriptions of implementations of the present invention will be described and explained through the use of the accompanying drawings.

Figure 1:
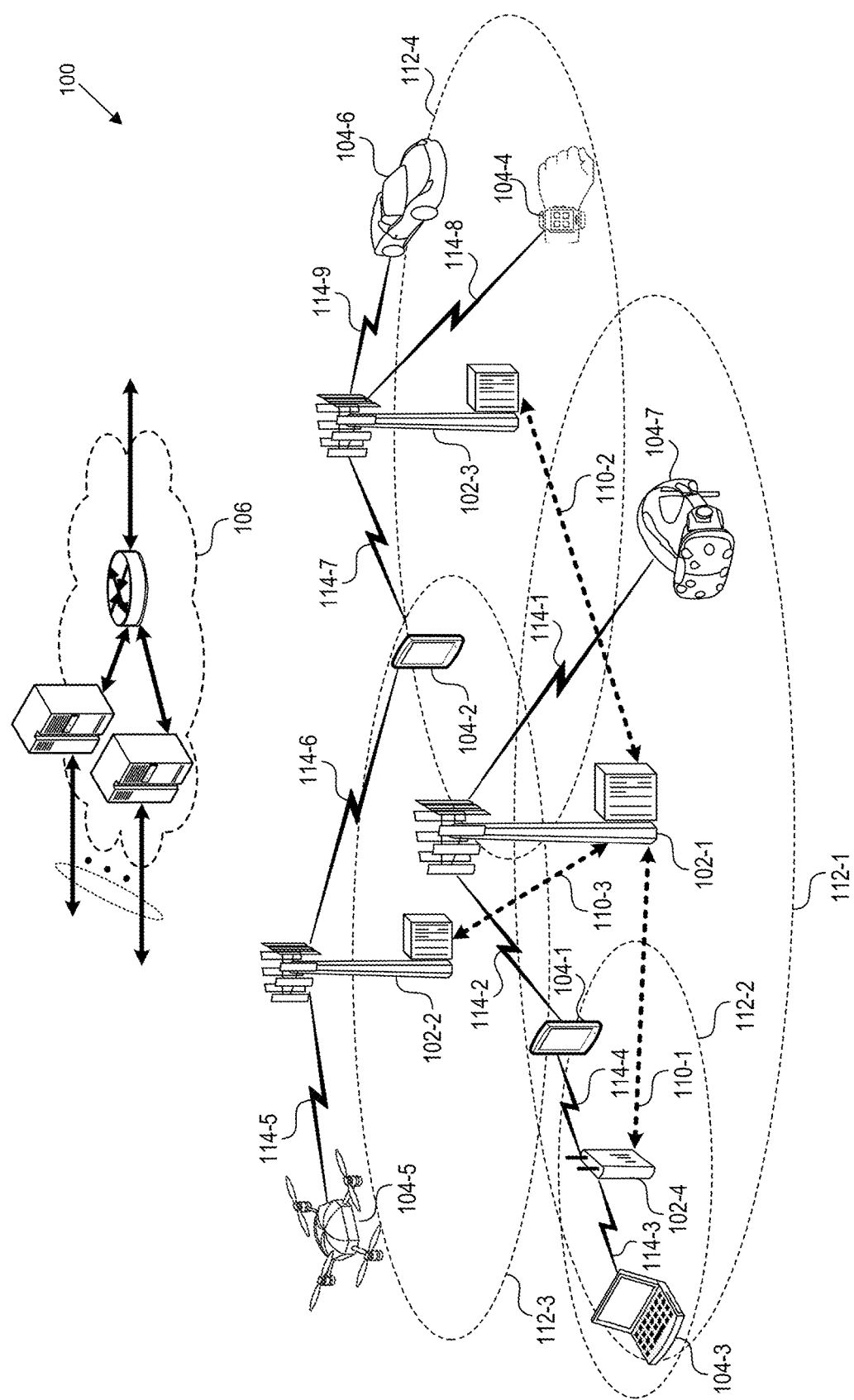
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In typical mobile communications systems, when a message is transmitted from a gateway to a routing element and a timeout indication is subsequently received at the gateway, a retry is attempted after a predetermined time interval. These retries are often transmitted toward the same routing element, which can be sufficient for temporary latency issues. However, when the routing element becomes unavailable for an extended period of time, then any retries toward the same routing element will also time out. In addition, even if gateways are configured to retry toward different routing elements, the resulting network will often be run in simplex mode until the unavailable routing elements are repaired. Simplex mode is generally not desired due to the inability of devices to communicate bi-directionally. Therefore, techniques are needed to route transmissions in the event of routing node failures that improve latency and reduce simplex mode operation compared to conventional systems.

The disclosed technology addresses these issues by introducing methods and systems for routing messages in mobile communications networks. For example, a system can include three routing elements that route messages from a gateway toward multiple network nodes. In this example, two of the routing elements receive messages from the gateway in a round-robin (RR) manner, while the third routing element is configured in a backup or low priority mode. If the gateway receives an indication that one of the first two routing elements is unavailable, such as a timeout message, the third routing element can then be used to route messages from the gateway to the network nodes, thereby improving redundancy and reducing latency.

Each of the routing elements can be configured to route messages to the various network nodes according to a preconfigured priority, such that the overall system functions with low latency no matter which routing element may become unavailable. For example, in a system with two network nodes, the first and second routing elements can be configured to forward traffic to the first and second network nodes, respectively, while the backup routing element can be preconfigured to route messages to both network nodes according to RR scheduling. This way, messages are routed to both network nodes no matter which of the first two routing elements is unavailable, which reduces the likelihood that either network node receives too much traffic. In addition, preconfiguring the backup routing element enables the network operator to quickly respond and activate the backup routing element, either manually or by an automated script. As a result, network service is not significantly impacted while the network is being restored.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
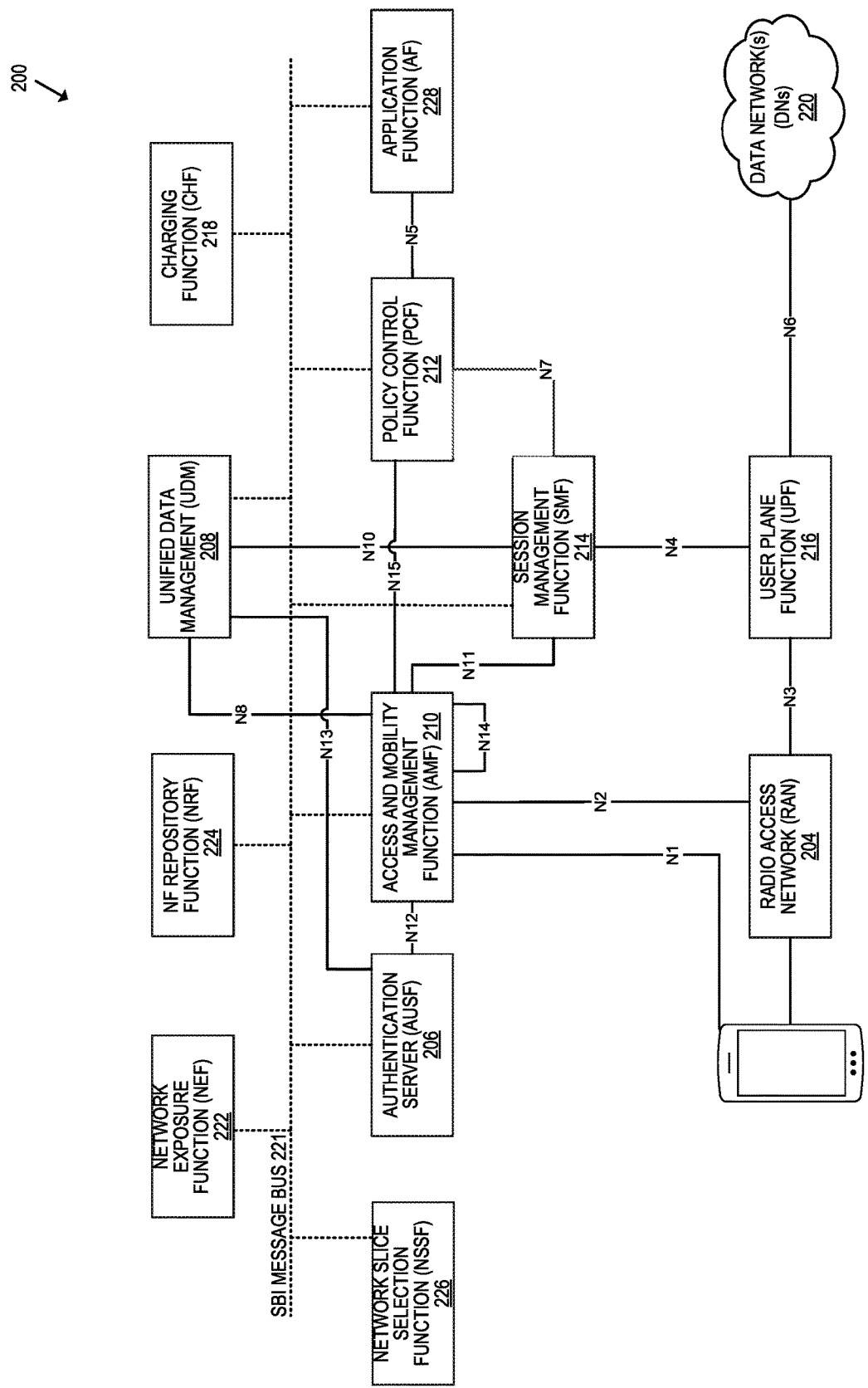
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Three-Element Routing System

Figure 3:
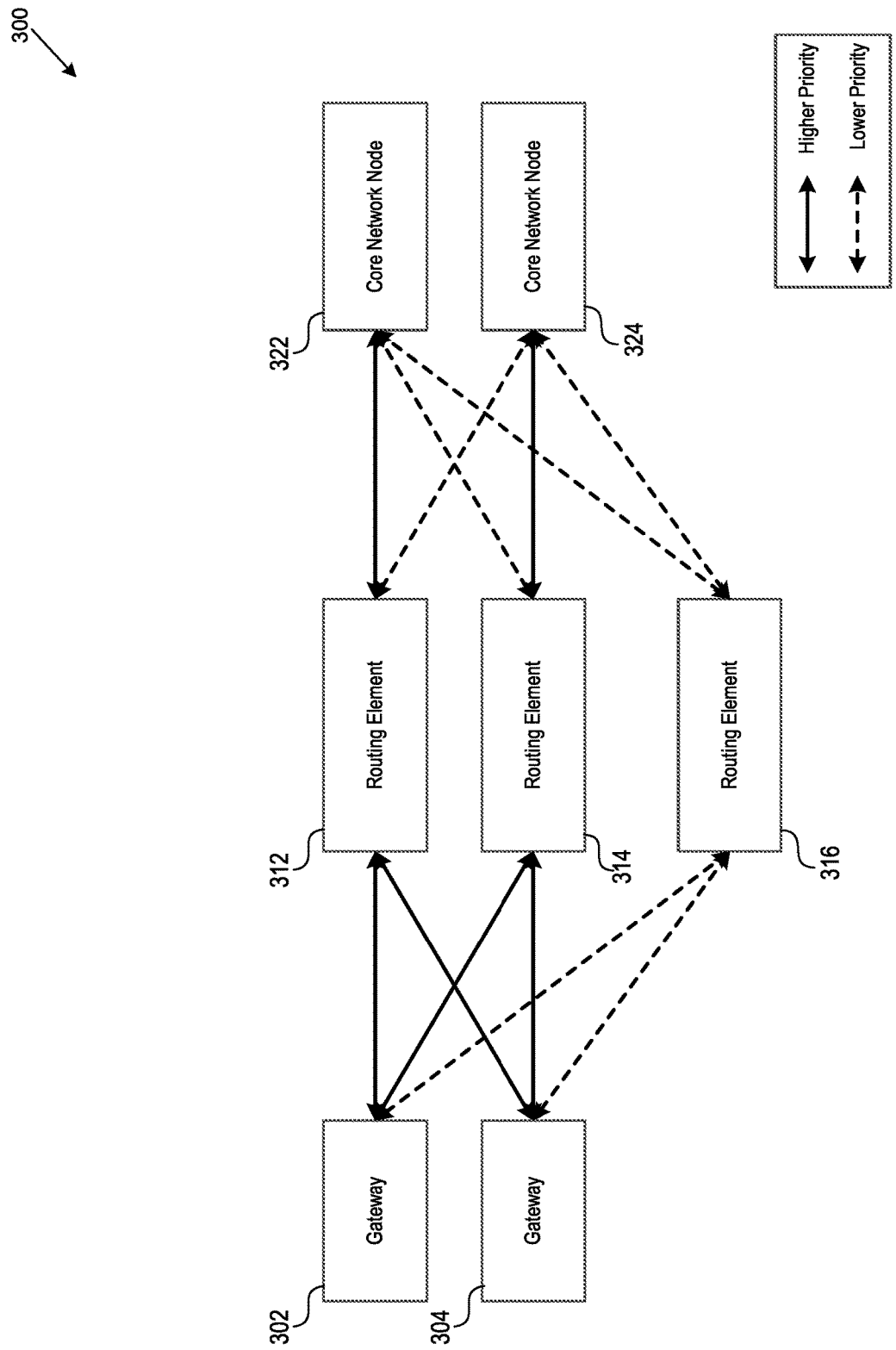
FIG. 3 is a block diagram that illustrates a system for routing telecommunications traffic.

FIG. 3 is a block diagram that illustrates a system 300 for routing telecommunications traffic. In some implementations, the system 300 operates as part of a packet core network, such as a Fourth Generation (4G) Evolved Packet Core (EPC) or a 5G core network as described with reference to FIG. 2 above. In regular operation, messages are transmitted from the gateways 302 and 304 to the routing elements 312 and 314, where the messages are then routed to the core network nodes 322 and 324. The third routing element 316 is configured as a backup, for example if either of the routing elements 312 or 314 become unavailable.

In some implementations, such as in 4G networks, the gateways 302 or 304 are packet gateways (PGWs) or session border gateways (SBGs). The routing elements 312-316 can be diameter routing agents (DRAs), and the core network nodes 322 and 324 can be policy charging rules functions (PCRFs). The gateways 302 and 304, such as PGWs or SGBs, can be configured to serve a relatively small geographic region such as a city. In contrast, the core network nodes 322 or 324 can be configured to serve a large region—for example, the entire United States can be served by about six PCRFs, which are located at different geographic sites. Similarly, the routing elements 312-316 can be based in different geographic regions. For example, the routing element 312 can be based in Washington state, the routing element 314 can be based in California, and the routing element 316 can be based in Texas. In some implementations, such as the 5G network shown in FIG. 1, the routing elements 312-316 are SCPs, such as described with reference to FIG. 2. For some implementations, such as 5G core network implementations, the core network nodes 322 and 324 can be PCFs (e.g., PCF 212 of FIG. 2). Even though terminology from the Third Generation Partnership Project (3GPP) are used in this document, the system 300 need not be restricted to standardized networks like 4G and 5G. For example, the routing elements 312 can be any suitable functional element that can receive and route messages.

The gateway 302 is configured to transmit messages to the routing elements 312 and 314 with an equal priority or weight, such as round robin scheduling. In round robin scheduling, messages are transmitted from the gateway 302 to routing elements 312 and 314 equally by allocating equal time for transmission to the two routing elements 302 and 312. In some implementations, the gateway 302 can alternately transmit messages or groups of messages to the routing elements 312 and 314. Similarly, the gateway 304 is also configured to transmit traffic to the routing elements 312 and 314 with equal priority. As a result, traffic is balanced between the two routing elements 312 and 314. Although FIG. 3 shows two gateways 302 and 304, other implementations of the system 300 can include different numbers of gateways, such as 1, 3, 4, or more.

Each gateway 302 and 304 is configured to transmit traffic to the third routing element 316 with a lower priority than for the routing elements 312 and 314. The lower priority is depicted in FIG. 3 with a dashed line, while the higher priority is shown as a solid line. Higher priority routing elements 312 and 314 are given preference over lower priority routing element 316. For example, in normal operations, gateways 302 and 304 can be configured to only transmit traffic to the higher priority routing elements 312 and 314 if available. Meanwhile, the lower priority links to the routing element 316 are associated with a standby or backup mode.

A network operator can then activate the lower priority routing element 316 by setting the priorities of the routing elements 312-316 equally, e.g., by raising the lower priority. For example, if either routing element 312 or 314 experiences latency issues or becomes unavailable, then the network operator can manually or automatically activate the routing element 316 by increasing its associated priority to prevent all traffic from being directed toward the remaining routing element. As a result, the gateways 302 and 304 then transmit messages according to RR scheduling to routing element 316 and the remaining available routing element, e.g., if routing element 312 is unavailable, then transmissions are routed to routing element 314 and routing element 316 as RR.

In some implementations, the lower priority routing element 316 is activated by an automated script. For example, the automated script can determine that a routing element 312 or 314 is unavailable, such as when a timeout indication is received at the gateway 302 or 304. Based on the determination, the script can then adjust the priority associated with routing element 316 or the routing elements 312 or 314 to enable transmissions to the routing element 316. As a result, if a routing element 312 in one geographic region becomes unavailable due to a power outage, natural disaster, equipment malfunction, or other issue, the network can be quickly switched to a backup mode that uses routing element 316 until the issue is resolved. This backup mechanism is enabled by preconfiguring transmission links between the gateways 302 and 304 and the routing elements 312-316 as described above, which minimizes the need for engineers to reconfigure the system 300 in case of emergency. In addition, the configuration of system 300 improves network performance compared to conventional systems by load balancing traffic even in backup mode, as further described below.

In an example, the routing element 312 is configured to transmit traffic to the core network node 322 and the core network node 324 according to a first priority and a second priority, respectively. As shown in FIG. 3, the first priority is higher than the second priority, such that traffic from the routing element 312 is always forwarded to the core network node 322 in normal operation, while the core network node 324 is a standby or backup node for the routing element 312. Similarly, the routing element 314 is configured to transmit traffic to the core network node 322 and the core network node 324 according to a third priority and a fourth priority, respectively. The fourth priority is higher than the third priority, such that traffic from the routing element 314 is forwarded to the core network node 324 in normal operation, while the core network node 322 is a standby or backup node for the routing element 314.

The routing element 316 is configured to transmit messages to the core network nodes 322 and 324 with an equal priority. For example, the routing element 316 can transmit messages according to RR scheduling. This ensures that if either of the primary routing elements 312 or 314 are unavailable, then both of the core network nodes 322 and 324 still receive messages. For example, if the routing element 312 is unavailable, then the routing elements 314 and 316 receive messages in equal proportion from the gateways 302 and 304. As shown in FIG. 3, routing element 314 is configured to forward messages to the core network node 324 with a higher priority than to the core network node 322. As a result, one-fourth of the total traffic from the gateways 302 and 304 is transmitted to the core network node 322, and three-fourths of the total traffic is transmitted to the core network node 324. Similarly, if routing element 314 becomes unavailable, then the routing element 316 can be activated so that three-fourths of the total traffic is transmitted to the core network node 322, and one-fourth of the total traffic is transmitted to the core network node 324.

When the unavailable routing element 312 or 314 is restored, then the flow of traffic can be restored to its previous configuration by lowering the priorities associated with the routing element 316. As a result, the routing element 316 again operates on standby. The priority associated with the routing element can be restored manually or by an automated script. For instance, an automated script executing at the gateway 302 or 304 can detect that a previously unavailable routing element 312 or 314 is restored. In response, the script can cause lower the priority associated with the link between the gateway 302 or 304 to the routing element 316, for example, back to the priority before the routing element 312 or 314 became unavailable.

As shown in FIG. 3, traffic is bi-directional. In this document, traffic that flows from a gateway 302 or 304 toward a core network node 322 or 324 is referred to as "upstream," while traffic that flows from the core network node 322 or 324 toward the gateway 302 or 304 is "downstream." In either case, the traffic is routed through the routing elements 312-316.

The core network nodes 322 and 324 are configured to transmit downstream traffic to the routing elements 312-316 according to various priorities. The priorities associated with upstream traffic can be configured independently of the priorities associated with downstream traffic. For example, the core network node 322 can be configured to transmit downstream traffic to the routing elements 312 and 314 in equal proportion, while the routing elements 312 and 314 can be configured to transmit upstream traffic to the core network node 322 in different proportions.

In some implementations, the core network nodes 322 and 324 are configured to transmit downstream traffic to the routing elements 312 and 314 with equal priority according to RR scheduling in normal operation, while the routing element 316 is a standby element. In this example, core network nodes 322 and 324 are configured to transmit messages to the routing element 316 with a lower downstream priority. If either of the primary routing elements 312 or 314 become unavailable, the lower downstream priority can be raised to activate the downstream link to the routing element 316.

In some implementations, a downstream message transmitted from a core network node 322 or 324 is a response to a corresponding upstream request. In such a case, the routing elements 312-316 can be configured to deliver the downstream response to the gateway that initially transmitted the request. For instance, the upstream request can include an identifier, such as a hostname, of the transmitting gateway 302 or 304. The routing element can then use the identifier when relaying the corresponding downstream response to ensure that responses are routed to the gateway that transmitted the respective request.

In some implementations, as shown in FIG. 3, the core network node 322 is configured to transmit downstream traffic to the routing element 312 with a higher downstream priority than priorities associated with the routing elements 314 and 316. Similarly, the core network node 324 can be configured to transmit downstream traffic to the routing element 314 with a higher downstream priority than priorities associated with the routing elements 312 and 316. In this example, if the routing element 312 becomes unavailable, two downstream priorities of the core network node 322 can be raised—a first priority associated with the routing element 314 and a second priority associated with the routing element 316.

Figure 4:
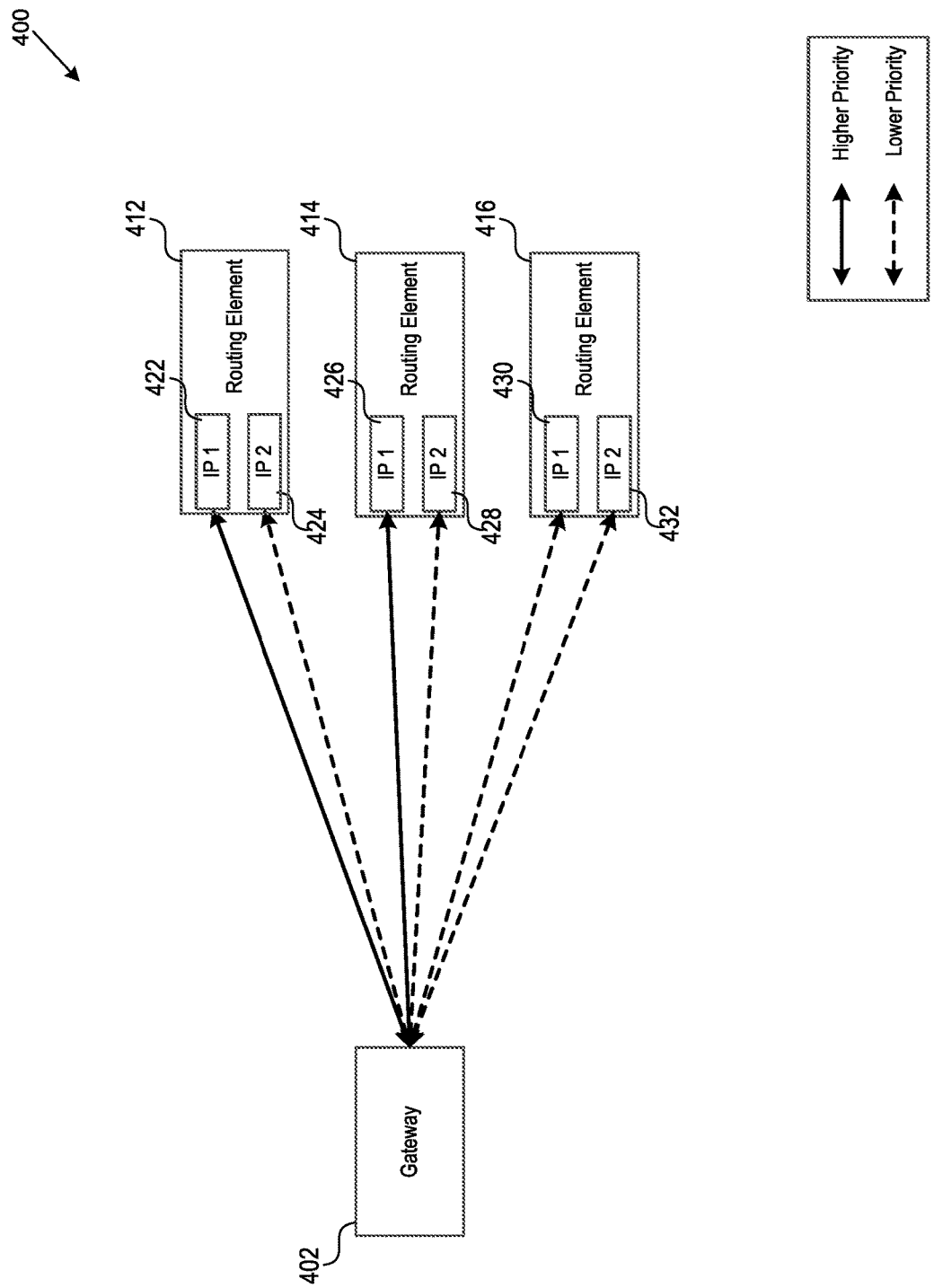
FIG. 4 is a block diagram that illustrates a system for routing telecommunications traffic.

FIG. 4 is a block diagram that illustrates a system 400 for routing telecommunications traffic. The system 400 can be similar to system 300 of FIG. 3. However, each of the routing elements 412-416 includes at least two addresses 422-432 for transmitting and receiving data. For example, the routing element 412 includes a first address 422, labeled "IP 1," and a second address 424, labeled "IP 2." The gateway 402 is configured to transmit messages on a per address basis. As shown, the gateway 402 is configured to transmit messages to the first address 422 with a first priority and to the second address 424 with a second priority, where the first priority is higher than the second priority. As a result, traffic between the gateway 402 and the routing element 412 is normally transmitted via the first address 422. The second address 424 can be configured as a backup, for example to reduce load on the first address 422. In some implementations, the first address 422 can become unavailable, and the second address 424 can be activated by adjusting an associated priority.

The gateway 402 is similarly configured to transmit messages to the routing element 414, where a first address 426 is associated with a higher priority and a second address 428 is associated with a lower priority. The higher priorities associated with the address 422 and the address 426 are equal, which results in an equal share of transmissions from the gateway 402. For example, the gateway 402 can transmit traffic in an RR manner to the address 422 of routing element 412 and to the address 426 of the routing element 414.

The routing element 416 can be similar to the routing element 316 shown in FIG. 3. The routing element 416 includes two addresses 430 and 432, but unlike the routing elements 412 and 414, both addresses 430 and 432 are associated with a lower priority. Configuring both links between the gateway 402 and the addresses 430 and 432 as low priority enables the routing element 416 to function as a backup to the other routing elements 412 and 414. For example, if either routing element 412 or 414 are unavailable, then either or both addresses 430 or 432 can be activated by adjusting the corresponding priorities.

In some cases, the entire routing element 412 can become unavailable, while in other cases only a single address 422 or 424 becomes unavailable. Therefore, if the gateway 402 receives an indication that a message was not received at the higher priority address 422 of routing element 412, then the gateway can first be configured to resend the message to the routing element 412 via the lower priority address 424. If the retry also fails, then the priorities associated with the routing element 416 can be adjusted to activate the backup mode, either using address 430, address 432, or both. In some implementations, the priority of address 430 or 432 is set equal to the priority of address 422 or 426. Activating the routing element 416 by adjusting the priority is advantageous over simply resending messages to the routing element 416 because latency is reduced. For example, there is no need to wait for the gateway 402 to receive a time out indication from the routing element 412 for each message that is retransmitted to the routing element 416.

In some implementations, the addresses 422 and 424 of the routing element 412 and the addresses 426 and 428 of routing element 414 are associated with different priority configurations than shown in FIG. 4. For example, the gateway can transmit messages to all four addresses 422-428 with the same high priority, such as according to RR scheduling. In this example, the addresses 430 and 432 of routing element 416 can be associated with a low priority like in the configuration shown in FIG. 4. In some implementations, each routing element 412-416 includes more than two addresses, such as three, four, or more.

As described above with reference to FIG. 3, both upstream traffic from a gateway and downstream traffic from a core network node can be directed through a routing element. Accordingly, although FIG. 4 shows routing configurations between an example gateway 402 and the routing elements 412-416, a core network node can also configured to route messages to the individual addresses 422-432 of the routing elements 412-416 with varying priorities. For example, a core network node similar to the core network nodes 322 and 324 of FIG. 3 can be implemented in FIG. 4.

Figure 5:
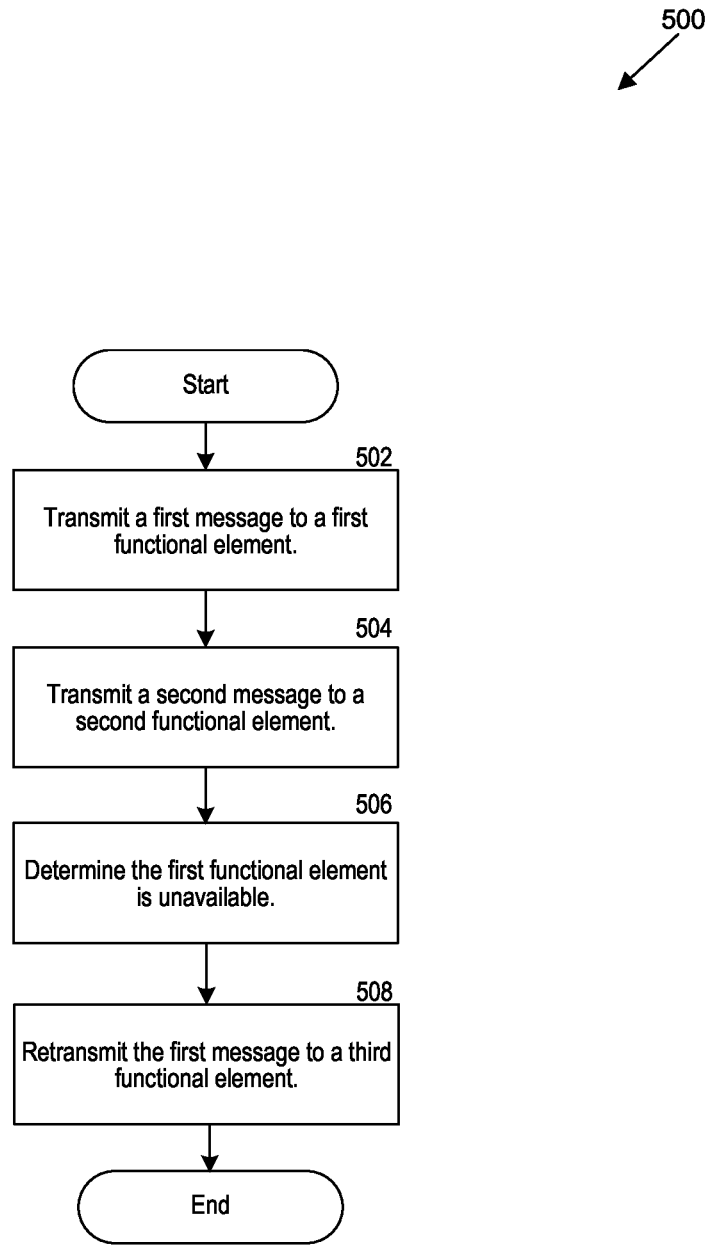
FIG. 5 is a flowchart that illustrates an example process for routing packets from a gateway.

FIG. 5 is a flowchart that illustrates an example process for routing packets from a gateway. The process 500 can be performed by a gateway that operates in a telecommunications network, such as the gateway 302 of FIG. 3 or the gateway 402 of FIG. 4. In some implementations, the gateway includes a PGW or an SGB.

At 502, a first message is transmitted to a first functional element. The first functional element can be similar to routing elements 312 or 314 of FIG. 3, or routing element 412 or 414 of FIG. 4. In some implementations, the first functional element is a DRA or a SCP. The first functional element is configured to route the first message to a first network node and a second network node according to a first priority and a second priority, respectively. In some implementations, the first priority is higher than the second priority.

At 504, a second message is transmitted to a second functional element. The second functional element is configured to route the second message to the first network node and the second network node according to a third priority and a fourth priority, respectively. In some implementations, the third priority is lower than the fourth priority. In some implementations, transmitting the first message to the first functional element at 502 and transmitting the second message to the second functional element at 504 is performed according to RR scheduling.

At 506, a determination is made that the first functional element is unavailable. For example, the determination can be based on receiving one or more indications from the first functional element. Alternatively, the determination can be based on an input from a network operator.

In some implementations, the first functional element and the second functional element are associated with a fifth priority, and a third functional element is associated with a sixth priority lower than the fifth priority. In these implementations, after determining the first functional element is unavailable at 506 the sixth priority is set equal to the fifth priority. Setting the sixth priority equal to the fifth priority activates the third functional element for receiving traffic. Setting the sixth priority equal to the fifth priority can be automatically performed by executing a script running on the gateway, where the script is configured to trigger in response to the determination that the first functional element is unavailable at 506.

At 508, the first message is retransmitted to a third functional element. The first message can be retransmitted based on the determination at 506. The third functional element is configured to route the first message to the first network node and the second network node with an equal priority. For example, the third functional element can be configured to transmit traffic to the first and second network nodes according to RR scheduling. By using the third functional element, the process 500 provides better network performance compared to conventional retry methods in the event a functional element is becomes unavailable.

Computer System

Figure 6:
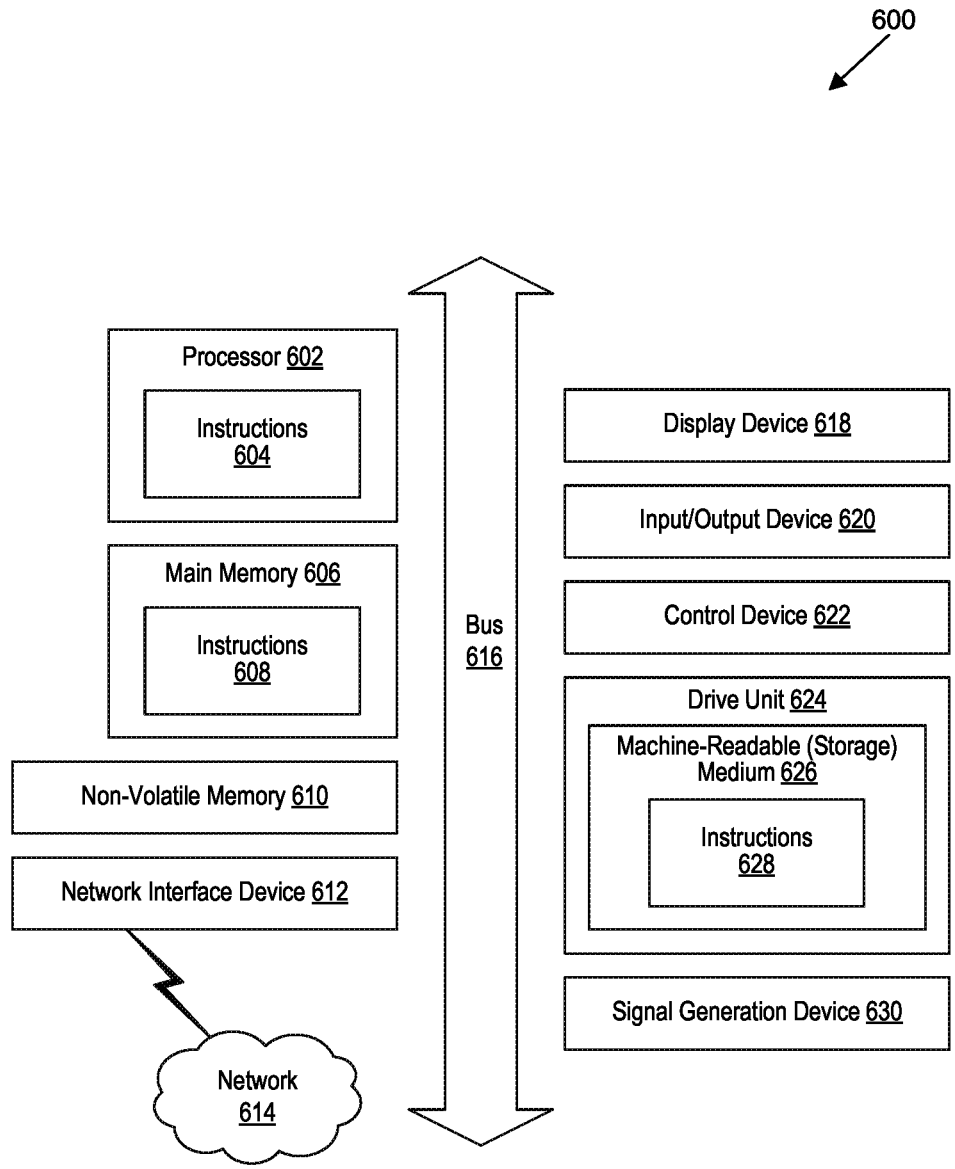
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computing system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed:

1. A telecommunications system comprising:
   a gateway;
   multiple routing elements including a first routing element, a second routing element, and a third routing element; and
   multiple core network nodes including a first core network node and a second core network node,
      wherein the gateway is configured to perform round-robin transmissions to the first routing element and the second routing element each according to a first priority and to perform transmissions to the third routing element according to a second priority lower than the first priority, wherein the first routing element is configured to route traffic to the first core network node and the second core network node according to a third priority and a fourth priority, respectively, the third priority higher than the fourth priority, wherein the second routing element is configured to route traffic to the first core network node and the second core network node according to a fifth priority and a sixth priority, respectively, the fifth priority lower than the sixth priority, wherein the third routing element is configured to route traffic to the first core network node and the second core network node according to round-robin scheduling, wherein when two destinations are associated with equal priority, traffic is equally balanced between the two destinations, and when the two destinations are associated with a higher priority and a lower priority, the traffic is only routed along the higher priority, and wherein the gateway is further configured to:
receive an indication that the first routing element is unavailable,
in response to the indication, activate a backup mode by setting the second priority equal to the first priority, and
perform round-robin transmissions to the second routing element and the third routing element.

2. The telecommunications system of claim 1, wherein the second priority, the fourth priority, and the sixth priority are associated with the backup mode.

3. The telecommunications system of claim 1, wherein the gateway is a first gateway, the system further comprising:
a second gateway configured to perform round-robin transmissions to the first routing element and the second routing element each according to a seventh priority and to perform transmissions to the third routing element according to an eighth priority lower than the seventh priority.

4. The telecommunications system of claim 1, wherein the gateway comprises a packet data network gateway (PGW) or a session border gateway (SBG), and wherein the multiple core network nodes comprise policy charging rules functions (PCRFs).

5. The telecommunications system of claim 1, wherein the multiple routing elements comprises diameter routing agents (DRAs) or service communication proxies (SCPs).

6. The telecommunications system of claim 1, wherein the first core network node is configured to:
transmit a message to the first routing element;
receive an indication the first routing element is unavailable; and
in response to the indication, retransmit the message to the second routing element or the third routing element.

7. The telecommunications system of claim 1, wherein the first routing element is located in a first geographic region and the second routing element is located in a second geographic region outside the first geographic region.

8. A telecommunications system comprising:
at least one hardware processor; and
at least one non-transitory memory storing instructions, which, when executed by the at least one hardware processor, causes the system to:
transmit a first message to a first functional element,
wherein the first functional element is configured to route the first message to a first network node and a second network node according to a first priority and a second priority, respectively,
wherein the first priority is higher than the second priority;
transmit a second message to a second functional element,
wherein the second functional element is configured to route the second message to the first network node and the second network node according to a third priority and a fourth priority, respectively,
wherein the third priority is lower than the fourth priority,
wherein the system is configured to transmit traffic to the first functional element and the second functional element with an equal fifth priority, and
wherein when two destinations are associated with equal priority, traffic between the two destinations is equally balanced, and when the two destinations are associated with a higher priority and a lower priority, the lower priority is associated with a backup mode; and
based on receiving an indication the first functional element or the second functional element are unavailable,
transmit a third message to a third functional element associated with a sixth priority lower than the fifth priority, and
activate a backup mode by setting the sixth priority equal to the fifth priority,
wherein the third functional element is configured to route the third message to the first network node and the second network node with equal priority, and
wherein the system is configured, based on the indication, to transmit traffic to an available functional element and the third functional element according to round-robin scheduling.

9. The telecommunications system of claim 8, wherein the indication indicates the first functional element is unavailable, and wherein the system is configured, based on the indication, to transmit traffic to the second functional element and the third functional element according to round-robin scheduling.

10. The telecommunications system of claim 8, wherein the first, second, and third functional elements are diameter routing agents (DRAs) or service communication proxies (SCPs).

11. The telecommunications system of claim 8, wherein the first functional element includes a first address and a second address, transmissions to the first functional element being transmitted to the first address and the second address according to a fifth priority and a sixth priority, respectively, the fifth priority higher than the sixth priority.

12. The telecommunications system of claim 8, wherein the first functional element includes a first address and a second address, the transmissions to the first functional element being transmitted to the first address and the second address with equal priority.

13. A method for routing packets from a gateway, the method comprising:
transmitting a first message to a first functional element,
wherein the first functional element is configured to route the first message to a first network node and a second network node according to a first priority and a second priority, respectively;
transmitting a second message to a second functional element,
wherein the second functional element is configured to route the second message to the first network node and the second network node according to a third priority and a fourth priority, respectively, wherein the first functional element and the second functional element are associated with a fifth priority, wherein when two destinations are associated with equal priority, traffic is equally balanced between the two destinations, and when the two destinations are associated with a higher priority and a lower priority, the traffic is only routed along the higher priority;

determining the first functional element is unavailable;

based on determining the first functional element is unavailable, activating a backup mode by increasing a sixth priority associated with a third functional element to be equal to the fifth priority, wherein the gateway is configured to transmit subsequent messages to the second functional element and the third functional element according to round-robin scheduling; and retransmitting the first message to the third functional element, wherein the third functional element is configured to route the first message to the first network node and the second network node with an equal priority.

14. The method of claim 13, wherein the first priority is higher than the second priority and wherein the third priority is lower than the fourth priority.

15. The method of claim 13, wherein said transmitting the first message to the first functional element and said transmitting the second message to the second functional element is performed according to round-robin scheduling.

16. The method of claim 15, wherein the first functional element and the second functional element are associated with a fifth priority, and wherein the third functional element is associated with a sixth priority lower than the fifth priority, the method further comprising:

based on said determining the first functional element is unavailable, setting the sixth priority equal to the fifth priority.

17. The method of claim 16, wherein said setting the sixth priority equal to the fifth priority is automatically performed by executing a script running on the gateway, the script configured to trigger in response to said determining the first functional element is unavailable.

* * * * *